H. POLSTER & A. LANG.
SPOOLING MACHINE.
APPLICATION FILED MAR. 24, 1911.
1,011,241.
Patented Dec. 12, 1911.
2 SHEETS—SHEET 1.
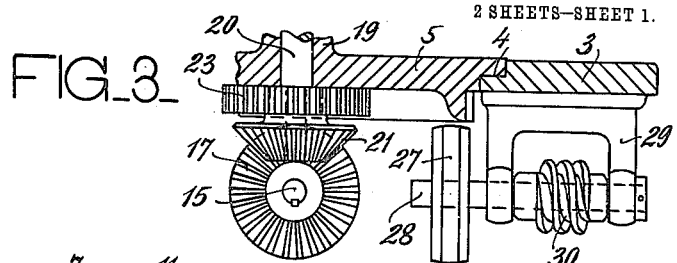
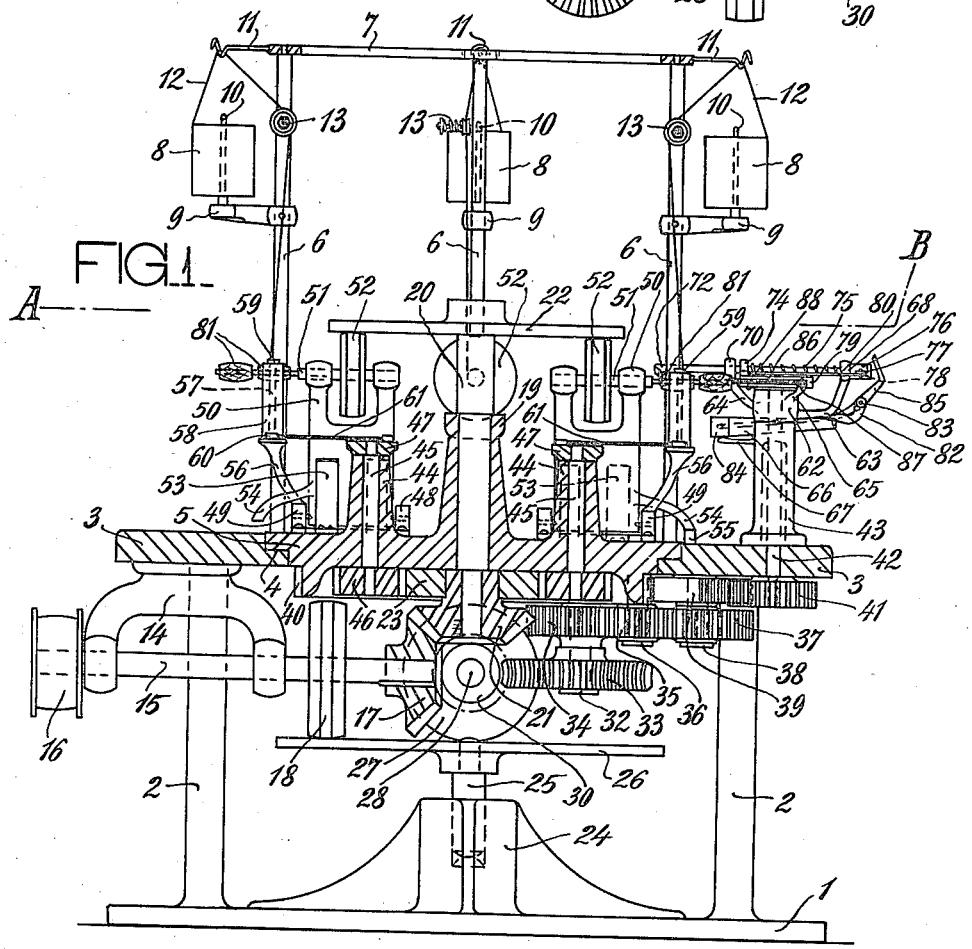
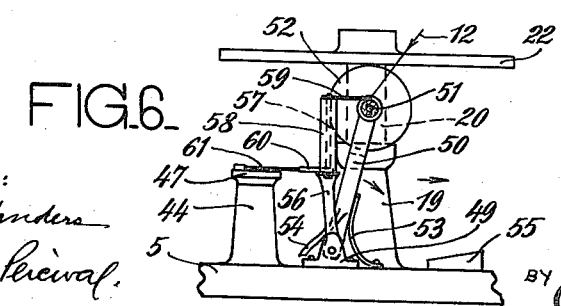
WITNESSES:
John C. Sanders
John A. Percival
INVENTORS:
Hermann Polster
Arno Lang
BY H. POLSTER & A. LANG.
SPOOLING MACHINE.
APPLICATION FILED MAR. 24, 1911.
1,011,241.
Patented Dec. 12, 1911.
2 SHEETS—SHEET 2.
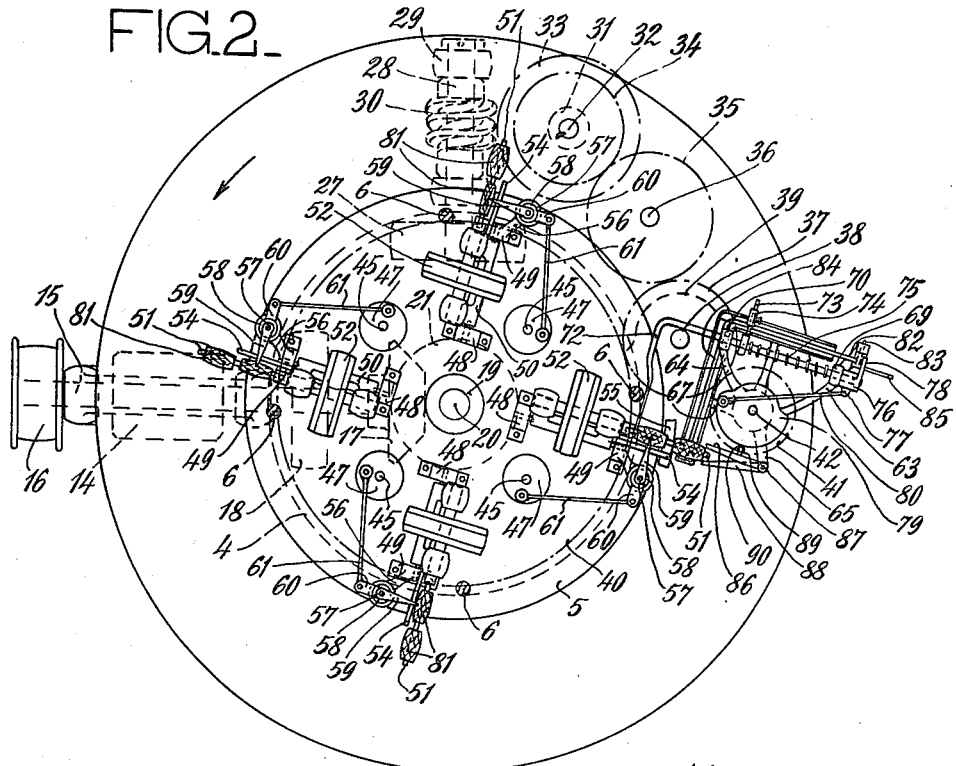
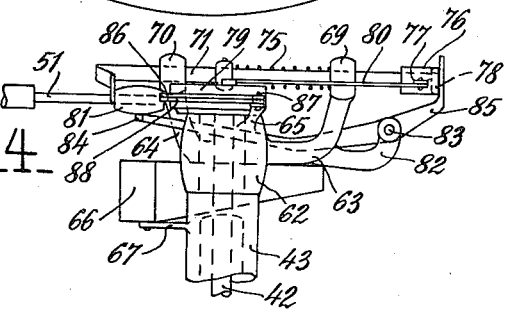
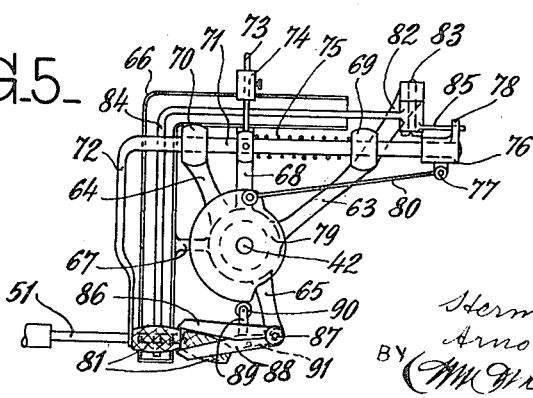
WITNESSES:
John C. Sanders
John A. Percival
INVENTORS:
Hermann Polster
Arno Lang
BY
ATTY.

UNITED STATES PATENT OFFICE.

HERMANN POLSTER AND ARNO LANG, OF PLAUEN, GERMANY.

SPOOLING-MACHINE.

1,011,241.  Specification of Letters Patent.  Patented Dec. 12, 1911.

Application filed March 24, 1911. Serial No. 616,758.

*To all whom it may concern:*

Be it known that we, HERMANN POLSTER and ARNO LANG, both subjects of the King of Saxony, residing at Plauen i. V., in the Kingdom of Saxony and Empire of Germany, have invented certain new and useful Improvements in Spooling-Machines, of which the following is a specification.

Our invention consists of a novel spooling machine, which is characterized by a rotary table supported by the frame and carrying a scaffold for holding large spools, bobbins, reels or the like.

Rocking jacks are distributed over the periphery of the rotary table and have each an arm and a spindle with a friction pulley. A vertical main shaft is turnable in the center of the rotary table and carries a friction plate. Thread- or yarn-guides are mounted on the rotary table to reciprocate along the spindles. Springs are disposed on the rotary table for pressing by the rocking jacks their friction pulleys upward against the friction plate. Means are provided for conducting the threads or yarns from the large spools, bobbins, reels or the like on the scaffold to the thread- or yarn-guides on the rotary table. A segment wheel is provided in the frame for alternately meshing with a concentric toothed ring at the rotary table and with a gear wheel at a device disposed on the frame. Thereby the rotary table is alternately turned through an angle and stopped, while the device is alternately operated during any stoppage of the rotary table and stopped. A cam is provided on the frame and is adapted to strike the arm of any rocking jack and to turn this jack for moving its friction pulley out of contact with the friction plate, so that the spindle stops. A mechanism is provided for driving the vertical main shaft and the segment wheel. The said device is adapted on being operated to push the spool formed on the spindle of the depressed jack out of reach of the thread- or yarn-guide into the place of the preceding spool, to glue the last turn of thread or yarn to the spool, and to cut off the preceding spool hanging on the spindle.

We will now proceed to describe our invention with reference to the accompanying drawings, in which—

Figure 1 is a vertical central section through the spooling machine, Fig. 2 is a horizontal section through the same on the line A—B in Fig. 1, Fig. 3 is a vertical central section through the table in a plane at right angles to that of Fig. 1, Fig. 4 is an elevation on an enlarged scale of the device for pushing the finished spool on the spindle out of reach of the thread- or yarn-guide into the place of the preceding spool, for gluing the last turn of thread or yarn to the spool, and for cutting off the preceding spool, Fig. 5 is a plan view of the same, and Fig. 6 is a side view of one of the rocking jacks with the spindle and friction pulley, also of the driving friction plate, and of the mechanism for reciprocating the thread- or yarn-guide.

Similar characters of reference refer to similar parts throughout the several views.

The frame is shown to consist of a base plate 1, four pillars 2, 2 and an annular supporting table 3. The inner periphery of the annular table 3 is set off, so as to form a lower inwardly projecting ring 4, the upper surface of which serves as a shoulder for supporting a rotary table 5. This table is so set off on its periphery as to engage in the hole of the annular supporting table 3 and to make its upper surface flush with that of the table 3. Of course this is not absolutely necessary. The rotary table 5 is shown to be rigidly connected with four pillars 6, 6, the upper ends of which are connected together by a ring 7, and the parts 6, 6, 7 form a scaffold for supporting large spools or reels. In the present case this scaffold is assumed to support four large spools 8, 8 by means of four arms 9, 9 vertically adjustable on the four pillars 6, 6 and each provided with a vertical pin 10 on which the spool 8 can turn. Above the four spools 8, 8 the ring 7 is provided with four guides 11, 11 of a known shape shown at Fig. 1, the spiral ends of which are preferably covered with felt or the like for freeing the threads or yarns 12, 12 from loosely adhering fibers and the like. Spring-pressed tightening devices 13, 13 of any known construction are provided on the four pillars 6, 6 for guiding and tightening the threads or yarns 12, 12.

At the lower surface of the annular supporting table 3 is fastened a forked bracket 14, in which a driving shaft 15 is mounted to turn. This shaft has fastened on it a driving pulley 16 at the outer end and a bevel wheel 17 at the inner end, while a friction pulley 18 of any known construction is longitudinally movable on the shaft 15, but is prevented from turning and can be adjusted in any known manner. The rotary table 5 has a vertical central bearing 19, in which a main shaft 20 is mounted to turn. This shaft has fastened on it a bevel wheel 21 at the lower end and a friction plate 22 at the upper end. The bevel wheel 21 meshes with the already mentioned bevel wheel 17 and is by its nave rigidly connected with a gear wheel 23 above. On the base plate 1 is a bearing 24, in which a vertical shaft 25 carrying a friction plate 26 is mounted to turn. The friction pulley 18 mentioned above engages the friction plate 26, which in turn engages another friction pulley 27 on a shaft 28 (Fig. 3). The shaft 28 turns in a forked bracket 29 fastened at the lower surface of the annular supporting table 5 and has fastened on it a worm 30. The friction pulley 27 is longitudinally movable on the shaft 28 but is prevented from turning thereon and can be adjusted in any known manner. It will be understood that the speed at which the shaft 28 is driven can be varied by longitudinally shifting the two friction pulleys 18 and 27 on their shafts. Of course the bevel wheel 17 must be clear of the friction plate 26. The annular supporting table 3 has a vertical bearing 31 (Fig. 2), in which a shaft 32 is mounted to turn. This shaft has fastened on it a worm wheel 33 and a gear wheel 34. The worm wheel 33 meshes with the already mentioned worm 30 and the gear wheel 34 meshes with an intermediate gear wheel 35, which turns on a pin 36 fastened in the supporting table 3. The gear wheel 35 in turn meshes with another gear wheel 37 which turns on a long pin 38 fastened in the table 3 and is rigidly connected with a segment wheel 39. This segment wheel is adapted to alternately mesh with a toothed ring 40 made in one with the rotary table 5 and with a gear wheel 41 fastened on a shaft 42, that is mounted to turn in the table 3 and in the upper end of a tubular support 43 (Fig. 4). The segment wheel 39 is so proportioned as to cause the gear wheel 41 to make one complete revolution each time and the rotary table 5 to turn through a certain angle, as will be explained later on.

The rotary table 5 is shown to have four vertical bearings 44, 44 for four shafts 45, 45 each of which has fastened on it a gear wheel 46 below and a crank disk 47 above. The several gear wheels 46, 46 mesh with the central gear wheel 23 already mentioned above. Four pairs of suitable bearings 48, 49 for the pivots of four rocking jacks 50, 50 are fastened on the rotary table 5. The jacks 50, 50 are placed approximately radially on the rotary table 5 and form at their upper forked ends bearings for winding spindles 51, 51, each of which has fastened on it between the two bearings a friction pulley 52. Four leaf springs 53, 53 (Fig. 6) fastened on the rotary table 5 serve for pressing on the four jacks 50, 50, whereby the four friction pulleys 52, 52 are pressed upward against the friction plate 22 mentioned above. It will be seen, that by the friction plate 22 the four friction pulleys 52, 52 are set to rotate rapidly. Each rocking jack 50 has an arm 54, which is adapted to strike against a cam 55 provided on the annular supporting table 3 and to ride over it, whereby the jack is turned downward through a small angle, so as to bring the friction pulley 52 out of contact with the friction plate 22 and thus to stop the spindle 51. Each outer bearing 49 is made in one with a support 56, which carries a vertical pin 57. On this pin a long nave 58 is made to rock, which is made in one with an arm 60 below and a thread- or yard-guide 59 above. The arm 60 is pivotally connected by a rod 61 with the pin of the corresponding crank disk 47 mentioned above.

The upper end of the support 43 is set off and on this reduced portion a collar 62 (Fig. 4) is fastened by means of set-screws or the like (not shown). The collar 62 may be cast in one with several arms 63, 64, 65 (Fig. 5) and with a bent box 66, with which the collar may be connected by ribs 67, 68 or the like. The upper ends of the two arms 63 and 64 form respectively two bearings 69 and 70, in which a rod 71 is made to longitudinally move. The rod 71 is made in one with an arm 72 on the left in Fig. 5, the free end of which arm is made to normally bear on any spindle 51 and to slide thereon. An arm 73 is fastened on the rod 71 and carries an adjustable weight 74 for more or less balancing the arm 72. A helical spring 75 inserted between the bearing 69 and the nave of the arm 73 and surrounding the rod 71 serves for pressing the latter into its normal position shown at Fig. 2. The rod 71 has fastened on its right end in Fig. 5 a collar 76 which is made in one with two opposite arms 77 and 78. On the upper end of the shaft 42 (Fig. 4) mentioned above is fastened a crank disk 79, the pin of which is pivotally connected with the arm 77 by means of a rod 80. It will be understood, that on every complete revolution of the crank disk 79 the rod 71 with the arm 72 will be once reciprocated. The free end of the arm 72 serves for pushing any spool 81 formed on the spindle 51 from left to right in Fig. 5, that is toward the free end of the spindle 51. The arm 63 is provided with a bent projection 82 (Fig. 4), in the upper free end of which a horizontal pin 83 is fastened. On this pin a bent arm 84 is mounted to rock, the portion of which parallel to the pin 83 is adapted to dip in some agglutinant introduced into the box 66, while the free end of this portion is adapted to apply some agglutinant to any spool 81 from below. The arm 84 has a rear arm 85, which is so bent upward, that the arm 78 on the collar 76 is adapted to strike against the rear arm 85 and thereby to raise the bent arm 84 for pressing its free end wetted with agglutinant against the spool 81. The upper free end of the arm 65 is rigidly connected with one blade 86 of a pair of scissors and has a pin 87, on which the other blade 88 is made to rock. The blade 88 has an arm 89 which carries a roller 90. The crank disk 79 is on its periphery so shaped as to form a cam disk, on which the said roller 90 can roll. A spring 91 fastened on the arm 65 serves for pressing by the blade 88 the roller 90 on the periphery of the said cam disk.

On the drawing we have shown the rotary table 5 to carry only four rocking jacks 50, 50, so that the segment wheel 39 would not be able to turn the table 5 through an angle of 90° for bringing any of the four spindles 51, 51 into the position of the spindle 51 on the right in Fig. 2. We therefore desire it to be expressly understood, that more than four rocking jacks 50, 50 are to be disposed on the rotary table 5 at an angle from one another sufficiently small to enable the segment wheel 39 to move all of the spindles 51, 51 one after the other into the position of the right spindle 51 shown in Fig. 2. In accordance therewith the scaffold on the rotary table 5 requires to be arranged accordingly, be it by making the number of the pillars 6, 6 like that of the large spools 8, 8 or by disposing on the four pillars an annular board for supporting the pins for the several large spools.

The spooling machine operates as follows: After placing the large spools 8, 8 on their pins 10, 10 and after adjusting the two friction pulleys 18 and 27 on their shafts in accordance with the desired number of revolutions of the spindles 51, 51 for each period and with the thickness of the thread or yarn and with the size of the spools to be formed the machine is started. During the work of the machine each thread or yarn 12 passing from its large spool 8 over the guide 11, where it is freed from loose fibers or the like, and over the tightening device 13 is conducted by the reciprocating thread- or yarn-guide 59, so that it is wound on the spindle 51 in the proper order. This winding goes on during the alternating slow turns and stoppages of the rotary table 5 until the jack 50 approaches the position of the right one in Fig. 2, when its arm 54 strikes against the cam 55 and rides over the same, whereby the jack is slightly turned downward, so that its friction pulley 52 comes out of contact with the friction plate 22 and its spindle 51 stops. Then the segment wheel 39 ceases meshing with the toothed ring 40 and consequently the rotary table 5 stops, while the segment wheel 39 commences to mesh with the gear wheel 41. Thereby the crank disk 79 is set to rotate, so that by its pin, the rod 80 and the arm 77 the rod 71 is longitudinally moved outward and the end of its arm 72 pushes the spool 81 just formed on the spindle 51 into the place of the preceding spool, which in turn slips off from the spindle 51 and hangs on the thread or yarn connecting it with the new spool. During the stroke of the rod 71 the arm 78 strikes against the rear arm 85 and thereby turns the bent arm 84 from the agglutinant in the box 66 upward and presses its free end wetted with agglutinant against the spool 81 just formed from below. Thereby the last turn of the thread or yarn is glued to the spool. Afterward the cam formed by the periphery of the crank disk 79 permits the movable blade 88 to follow the pull of the spring 91 so that the pair of scissors 86, 88 cuts through the thread or yarn still connecting the two spools 81, 81 and consequently the preceding spool 81 now liberated drops into some basket or the like (not shown). The rod 71 is again returned to its normal position and the bent arm 84 is lowered into the agglutinant. Then the segment wheel 39 ceases meshing with the gear wheel 41, so that the crank disk 79 stops, and as the segment wheel again meshes with the toothed ring 40, the rotary table 5 commences to slowly turn. As meanwhile the arm 54 of the jack 50 has left the cam 55, the spring 53 will press the friction pulley 52 against the friction plate 22, whereby the spindle 51 is again started. As the thread or yarn is still on the spool 81 it will remain tight, so that the spindle 51 is enabled to wind on the thread or yarn 12 for forming a fresh spool.

The spooling machine described can be varied in many respects without departing from the spirit of our invention.

We claim:

1. In a spooling machine, the combination with a frame, of a rotary table supported by said frame, means for intermittently turning said rotary table, jacks on said rotary table distributed over the periphery, spindles carried by said jacks, thread- or yarn-guides reciprocating on said rotary table along said spindles, means for supplying threads or yarns to said thread- or yarn-guides, means for driving said spindles intermittently, means for pushing the spool formed on the said spindles out of reach of the thread- or yarn-guide into the place of the preceding spool, means for gluing the last turn of thread or yarn to the spool, and means for cutting off the preceding spool hanging on the spindle.

2. In a spooling machine, the combination with a frame, of a rotary table supported by said frame, means for intermittently turning said rotary table, jacks on said rotary table distributed over the periphery, spindles carried by said jacks, thread- or yarn-guides reciprocating on said rotary table along said spindles, means for supplying threads or yarns to said thread- or yarn-guides, means for driving said spindles intermittently, and a device on said frame adapted to push the spool formed on the said spindles out of reach of the thread- or yarn-guide into the place of the preceding spool, to glue the last turn of thread or yarn to the spool, and to cut off the preceding spool hanging on the spindle.

3. In a spooling machine, the combination with a frame, of a rotary table supported by said frame, a vertical main shaft turnable in the center of said rotary table, means for driving said main shaft, a friction plate on said main shaft, means for intermittently turning said rotary table, rocking jacks on said rotary table distributed over the periphery, spindles and arms carried by said jacks, friction pulleys on said spindles adapted to engage said friction plate, springs for pressing said friction pulleys against said friction plate, a cam on said frame adapted to strike against the arms of said jacks and to turn each jack for moving its friction pulley out of contact with said friction plate and thus stopping the spindle, thread- or yarn-guides reciprocating on said rotary table along said spindles, means for supplying threads or yarns to said thread- or yarn-guides, a device on said frame adapted to push the spool formed on the spindle in any of said jacks operated by said cam out of reach of the thread- or yarn-guide into the place of the preceding spool, to glue the last turn of thread or yarn to the spool, and to cut off the preceding spool hanging on the spindle, and means for operating said device.

4. In a spooling machine, the combination with a frame, of a rotary table supported by said frame, a vertical main shaft turnable in the center of said rotary table, a friction plate on said main shaft, a concentric toothed ring on said rotary table, a device on said frame comprising a shaft, a gear wheel on the shaft of said device, a segment wheel turnable in said frame and adapted to mesh alternately with said toothed ring and with said gear wheel, so that said rotary table is intermittently turned, while said device is intermittently operated alternately to said table, rocking jacks on said rotary table distributed over the periphery, spindles and arms carried by said jacks, friction pulleys on said spindles adapted to engage said friction plate, springs for pressing said friction pulleys against said friction plate, a cam on said frame adapted to strike against the arms of said jacks and to turn each jack successively for moving its friction pulley out of contact with said friction plate and thus stopping the spindle, thread- or yarn-guides reciprocating on said rotary table along said spindles, means for supplying threads or yarns to said thread- or yarn-guides, said device being adapted to push the spool formed on the spindle of said jacks operated by said cam out of reach of the thread- or yarn-guide into the place of the preceding spool, to glue the last turn of thread or yarn to the spool, and to cut off the preceding spool hanging on the spindle, and a mechanism for driving said main shaft and said segment wheel.

5. In a spooling machine, the combination with a frame, of a rotary table supported by said frame, means for intermittently turning said rotary table, a scaffold on said rotary table, bobbins on said scaffold, jacks on said rotary table distributed over the periphery, spindles carried by said jacks, thread- or yarn-guides reciprocating on said rotary table along said spindles, means for conducting the threads or yarns from said bobbins to said thread- or yarn-guides, means for intermittently driving said spindles, means for pushing the spool formed on each spindle successively out of reach of the thread- or yarn-guide into the place of the preceding spool, means for gluing the last turn of thread or yarn to the spool, and means for cutting off the preceding spool hanging on the spindle.

6. In a spooling machine, the combination with a frame, of a rotary table supported by said frame, means for turning said rotary table, a scaffold on said rotary table, bobbins on said scaffold, jacks on said rotary tables distributed over the periphery, spindles carried by said jacks, thread- or yarn-guides reciprocating on said rotary table along said spindles, means for conducting the threads or yarns from said bobbins to said thread- or yarn-guides, means for intermittently driving said spindles, and a device on said frame adapted to push the spool formed on each successive spindle out of reach of the thread- or yarn-guide into the place of the preceding spool, to glue the last turn of thread or yarn to the spool, and to cut off the preceding spool hanging on the spindle.

7. In a spooling machine, the combination with a frame, of a rotary table supported by said frame, a vertical main shaft turnable in the center of said rotary table, means for driving said main shaft, a friction plate on said main shaft, means for intermittently turning said rotary table, rocking jacks on said rotary table distributed over the periphery, spindles and arms carried by said jacks, friction pulleys on said spindles adapted to engage said friction plate, springs for pressing said friction pulleys against said friction plate, a cam on said frame adapted to strike successively against the arms of said jacks and to turn the jack for moving its friction pulley out of contact with said friction plate and thus stopping the spindle, a scaffold on said rotary table, bobbins on said scaffold, thread- or yarn-guides reciprocating on said rotary table along said spindles, means for conducting the threads or yarns from said bobbins to said thread- or yarn-guides, a device on said frame adapted to push the spool formed on the spindle in the jacks operated by said cam out of reach of the thread- or yarn-guide into the place of the preceding spool, to glue the last turn of thread or yarn to the spool, and to cut off the preceding spool hanging on the spindle, and means for operating said device.

8. In a spooling machine, the combination with a frame, of a rotary table supported by said frame, a vertical main shaft turnable in the center of said rotary table, a friction plate on said main shaft, a concentric toothed ring on said rotary table, a device on said frame comprising a shaft, a gear wheel on the shaft of said device, a segment wheel turnable in said frame and adapted to mesh alternately with said toothed ring and with said gear wheel, so that said rotary table is intermittently turned, while said device is intermittently operated alternately of said rotary table, rocking jacks on said rotary table distributed over the periphery, spindles and arms carried by said jacks, friction pulleys on said spindles adapted to engage said friction plate, springs for pressing said friction pulleys against said friction plate, a cam on said frame adapted to strike successively against the arms of said jacks and to turn the jack for moving its friction pulley out of contact with said friction plate and thus stopping the spindle, a scaffold on said rotary table, bobbins on said scaffold, thread- or yarn-guides reciprocating on said rotary table along said spindles, means for conducting the threads or yarns from said bobbins to said thread- or yarn-guides, said device being adapted to push the spool formed on the spindles of said jacks operated by said cam out of reach of the thread- or yarn-guide into the place of the preceding spool, to glue the last turn of thread or yarn to the spool, and to cut off the preceding spool hanging on the spindle, and a mechanism for driving said main shaft and said segment wheel.

In testimony whereof we affix our signatures in presence of two witnesses.

HERMANN POLSTER.
ARNO LANG.

Witnesses:
BERNHARD KIENAST,
KARL ROBERT SCHUSTER.